US 9,204,475 B2

(12) United States Patent
Wang et al.

(10) Patent No.: US 9,204,475 B2
(45) Date of Patent: Dec. 1, 2015

(54) METHOD, SYSTEM, AND APPARATUS FOR SELECTING DATA PLANE TUNNEL ACCORDING TO THE STATUS OF USER EQUIPMENT

(75) Inventors: Hucheng Wang, Beijing (CN); Ming Ai, Beijing (CN); Yanfei Zhou, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 72 days.

(21) Appl. No.: 13/634,543

(22) PCT Filed: Mar. 11, 2011

(86) PCT No.: PCT/CN2011/071740
§ 371 (c)(1),
(2), (4) Date: Nov. 27, 2012

(87) PCT Pub. No.: WO2011/110106
PCT Pub. Date: Sep. 15, 2011

(65) Prior Publication Data
US 2013/0058292 A1 Mar. 7, 2013

(30) Foreign Application Priority Data
Mar. 12, 2010 (CN) .......................... 2010 1 0124871

(51) Int. Cl.
*H04W 76/02* (2009.01)
*H04W 76/04* (2009.01)
(52) U.S. Cl.
CPC .......... *H04W 76/022* (2013.01); *H04W 76/041* (2013.01)
(58) Field of Classification Search
None
See application file for complete search history.

(56) References Cited

U.S. PATENT DOCUMENTS

| 7,139,276 B1 | 11/2006 | Sitaraman et al. |
| 8,588,793 B2 * | 11/2013 | Tomici et al. ................. 455/445 |
| 2010/0103862 A1 * | 4/2010 | Ulupinar et al. .............. 370/315 |
| 2010/0322068 A1 | 12/2010 | Grahn et al. |

FOREIGN PATENT DOCUMENTS

| CN | 1794836 | 6/2006 |
| CN | 101265159 | 2/2008 |

(Continued)

OTHER PUBLICATIONS

"3rd Generation Partnership Project; Technical Specification Group Services and System Aspects; Local IP Access and Selected IP Traffic Offload; (Release 10)." 3GPP TR 23.829 v0.4.0 (Feb. 1, 2010), Sections 5.7.2, 5.7.4 and 5.7.5, pp. 1-29.

(Continued)

*Primary Examiner* — Hong Cho
(74) *Attorney, Agent, or Firm* — Ladas & Parry, LLP

(57) ABSTRACT

The present invention puts forward a method, a system and an apparatus for selecting a data plane tunnel according to the status of User Equipment (UE). The system comprises a Serving Gateway (SGW) and a Local Gateway (LGW), wherein, the SGW is used for determining the status of the UE and whether a connection is used for Local IP Access (LIPA)/Selected IP Traffic Offload (SIPTO), and instructs the LGW; the LGW is used for setting a tunnel identifier status of the LGW according to the instruction of the SGW, and selecting the data plane tunnel according to the tunnel identifier status. The present invention selects an appropriate data plane tunnel by setting a tunnel identifier in an LGW, and proposes a method for controlling the to setting/clearing of the tunnel identifier, therefore the present invention enjoys comprehensive functions and may make up the deficiency of LIPA/SIPTO architecture in the prior art.

21 Claims, 6 Drawing Sheets

(56) References Cited

FOREIGN PATENT DOCUMENTS

| CN | 101136835 | 3/2008 |
|---|---|---|
| WO | 2008080717 | 7/2008 |
| WO | 2009039886 | 4/2009 |

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 9)." 3GPP TS 23.401 v9.3.0 (Dec. 15, 2009), pp. 1-254.

IPRP for related PCT/CN2011/071740 issued on Sep. 18, 2012 and its English translation.

ISR for related PCT/CN2011/071740 mailed on Jun. 9, 2011 and its English translation.

Office Action for related Chinese Patent Application 2010101248716 dated Jan. 25, 2013 and its English translation by the applicants.

* cited by examiner

METHOD, SYSTEM, AND APPARATUS FOR SELECTING DATA PLANE TUNNEL ACCORDING TO THE STATUS OF USER EQUIPMENT

CROSS-REFERENCE TO RELATED APPLICATIONS

This application is the U.S. National Stage of International Patent Application No. PCT/CN2011/071740 filed on Mar. 11, 2011, which claims priority to Chinese Patent Application No. 20101024871.6 entitled "Method, System and Apparatus for Selecting Data Plane Tunnel according to the Status of User Equipment" filed in the Patent Office of the People's Republic of China on Mar. 12, 2010, the disclosures of which are hereby incorporated by reference in their entireties.

FIELD OF THE INVENTION

The present invention relates to the field of communication technology, in particular to a method, a system and an apparatus for selecting a data plane tunnel according to the status of User Equipment (UE).

BACKGROUND OF THE INVENTION

In the prior art of LIPA (Local IP Access)/SIPTO (Selected IP Traffic Offload), an LGW (Local Gateway) is additionally arranged in the existing H(e)NB (Home evolved NodeB) system. When the LIPA/SIPTO is enabled, the LGW and H(e)NB may realize the uplink and downlink data transmission via a direct tunnel. FIG. 1 shows a schematic diagram of the LIPA/SIPTO architecture in the prior art. In such architecture, when a UE initiates a request for LIPA to an MME (Mobility Management Entity) possibly through a special APN (Access Point Name) or a special Attach type, the MME will select an LGW for serving the UE, in which case the minimum granularity of the LIPA is PDN (Packet Data Network) Connection. Furthermore, the MME may also enable the HeNB to serve as the SIPTO according to the network status and the UE-requested service type, and shows L-GW via a special APN or a special identifier that the connection is used for SIPTO, in which case the minimum granularity of the SIPTO is PDN Connection level.

If a UE is in an idle status, that is, the UE has undergone the S1 Release procedure, the Direct Tunnel shall be in inactive state and the LGW will initiate the SGW (Serving Gateway) to send a paging message via the S5/S8-U tunnel when downlink data is available.

If a UE is in a connected status, that is, the UE has initiated a Service Request procedure, the MME will inform the HeNB of the S5 PGW TEID (LGW allocated) via an S1-MME interface, and then the HeNB will store the TEID (Tunnel Identifier) in a radio bearer context, as shown in FIG. 2. In this case, the LGW and the HeNB may realize the data transmission via a Direct Tunnel: for the downlink data, the LGW needs to find out the corresponding S5 PGW TEID first through EPS (Evolved Packet System) Bearer binding, and then sends a data package which shall contain the information of S5 PGW TEID to a direct tunnel; after receiving the package, the HeNB needs to find out the corresponding E-RAB (Radio Access Bear) Context and Radio Bearer according to the S5 PGW TEID in the package and then sends it to the UE; for the uplink data, the HeNB needs to confirm whether the E-RAB context contains the information of S5 PGW TEID. If yes, it will send the data to the LGW via a Direct Tunnel.

In the process of realizing the objects of the present invention, at least the following problems existing in the prior art were found: in the prior art, the HeNB determines whether to enable a Direct Tunnel according to the existence of S5 PGW TEID in E-RAB context. For the downlink data, the LGW also needs to determine whether to to enable a direct tunnel according to some identifier. If the UE is in a connected status, that is, the UE has undergone the Service Request or UE Requested PDN Connectivity procedure, the LGW needs to select a direct tunnel; if the UE is in an idle status, that is, the UE has undergone the S1 Release procedure, the LGW needs to select the S5/S8-U Tunnel in order to initiate the SGW to send a Paging message when downlink data arrives. However, the LGW in the prior art doesn't know the status of the UE, so it can't determine when to enable the Direct Tunnel or the S5/S8-U Tunnel.

SUMMARY OF THE INVENTION

The embodiments of the present invention provide a method, a system and an apparatus for selecting a data plane tunnel according to the status of a User Equipment (UE), which aims to solve the disadvantages existing in the prior art that the LGW can't determine whether to select the Direct Tunnel or S5/S8-U Tunnel due to its failure to know the status of the UE.

In order to achieve these goals, the present invention puts forward a method for selecting a data plane tunnel according to the status of the User Equipment (UE) on the one hand, comprising the following steps: an LGW sets a tunnel identifier status of the LGW according to the instruction of a SGW, and selects a data plane tunnel according to the tunnel identifier status.

On the other hand, the present invention puts forward a system for selecting a data plane tunnel according to the status of a User Equipment (UE), comprising an SGW and an LGW, wherein, the SGW is used for determining the status of the UE and whether a connection is used for LIPA/SIPTO, and instructs the LGW; the LGW is used for setting a tunnel identifier status of the LGW according to the instruction of the SGW, and selecting a data plane tunnel according to the tunnel identifier status.

Additionally, the present invention puts forward an LGW, comprising a setting module and a tunnel selection module, wherein, the setting module is used for setting a tunnel identifier status according to the instruction of the SGW, and the tunnel selection module is for selecting a data plane tunnel according to the tunnel identifier status.

Further more, the present invention puts forward a method for selecting a data plane tunnel according to the status of a UE, comprising the following steps: when the UE is in an idle status, the LGW enables the S5/S8-U tunnel; when the UE is in a connected status, the LGW enables the Direct Tunnel.

The present invention selects an appropriate data plane tunnel by setting a tunnel identifier in an LGW, and proposes a method for controlling the setting/clearing of the tunnel identifier, therefore the present invention enjoys comprehensive functions and may make up the disadvantages of LIPA/SIPTO architecture in the prior art.

Other additional aspects and advantages of the present invention will be apparent from the following detailed description of the preferred embodiments or understood from the practice of the present invention.

BRIEF DESCRIPTION OF THE DRAWINGS

The aforesaid and/or additional aspects and advantages of the present invention will be apparent and easy to understand from the disclosure of the preferred embodiments of the present invention hereinbelow with reference to the accompanying drawings, wherein.

DETAILED DESCRIPTION OF THE PREFERRED EMBODIMENTS

The embodiments of the present invention are described in details hereinbelow. The examples of the embodiments are illustrated in the accompanying drawings, throughout which the same or similar symbols denote the same or similar components or those with the same or similar functions. It is to be understood that the disclosure of the embodiments with reference with the accompanying drawings are illustrative and exemplary of the present invention, which is not intended or to be constructed to limit the present invention.

In the embodiments of the present invention, each UE is additionally arranged with a tunnel identifier in an LGW. When the UE is in an Idle status, the identifier is set as disabled; when the UE is in a Connected status, the identifier is set as enabled. If the identifier is set as disabled, the LGW will select the S5/S8-U Tunnel; conversely, the LGW will select a Direct Tunnel, so as to realize the selection of a data plane tunnel according to the UE status.

In the embodiments of the present invention, the controlling over the selection of a data plane tunnel may be realized by controlling the tunnel identifier in the LGW. It is to be noted that the following embodiments are only preferred embodiments of the present invention, which doesn't mean that the present invention can only be realized through the following embodiments. Those skilled in the art may make equivalent changes and modifications to the following embodiments without departing from the substance or scope of the present invention, and such changes and modifications shall also be included in the scope of the present invention.

Embodiment I

In the embodiment I, as there is no UE context available for an SGW, an MME needs to inform the SGW by adding IE (Information Elements) in the GTPC (GPRS Tunneling Protocol for Control Plane) message (such as Create Session Request message), indicating the PDN Connection is being established via LIPA/SIPTO, thus enabling the SGW to inform the PGW of how to select a data plane tunnel. This embodiment is applied in occasions where the status of the UE is not changed frequently, which may reduce the resource usage and maintenance operation of the SGW.

Figure 1:
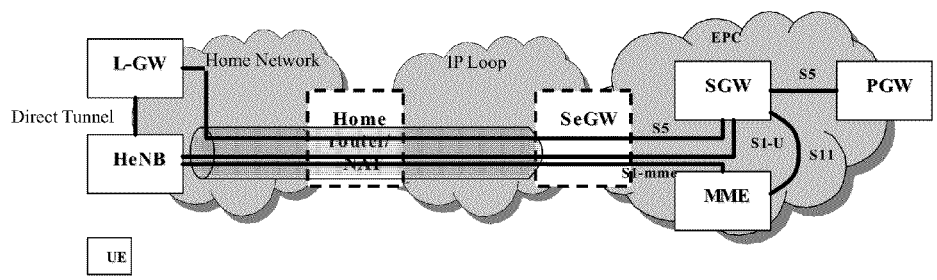
FIG. 1 is a schematic diagram of the LIPA/SIPTO architecture in the prior art.
Figure 2:
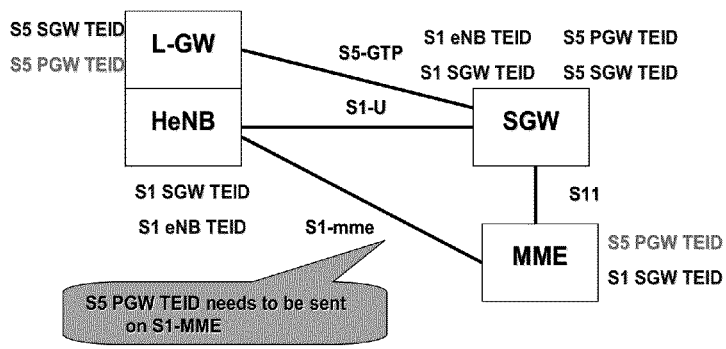
FIG. 2 is a schematic diagram of TEID allocation in the prior art.
Figure 3:
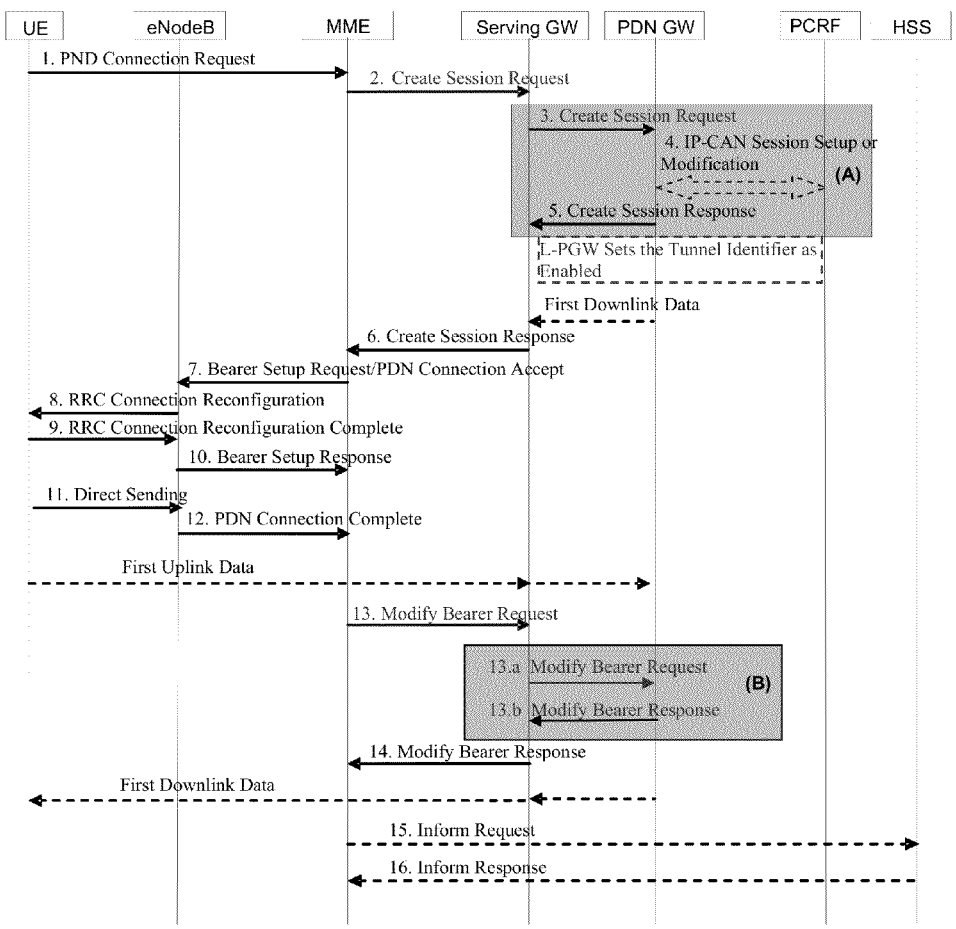
FIG. 3 is a schematic diagram of the UE Requested PDN Connectivity or Attach procedure when the UE is in a Connected status described in the embodiment I of the present invention.

If the UE is in a Connected status,

The UE Requested PDN Connectivity or Attach procedure is as shown in FIG. 3, wherein, the steps 1, 4, 5, 6~12 and 14~16 which relate to the prior art will not be described herein and may be referred to the protocol TS23.401 5.10.2, while the steps relating to the embodiments of the present invention are described in details hereinbelow.

Step 2~3: if the system informs the LGW with a special identifier, that is, the connection (to be established) is used for LIPA/SIPTO, the special identifier needs to be contained in the Create Session Request message. If the system informs the LGW with a special APN, the LGW needs to determine whether the connection is used for LIPA/SIPTO, in which case, the PGW used in LIPA/SIPTO connection is an LGW.

Step 5*a*: if the UE requests for LIPA connection or the SIPTO connection is detected by the network, the LGW will set the tunnel identifier of the connection as enabled, indicating that the LGW uses a Direct Tunnel.

Step 13: after determining whether the connection is an LIPA or SIPTO Connection according to the PDN Connection context, the MME will add an LIPA or SIPTO connection establishment identifier in the Modify Bearer Request message, informing the SGW that the PDN Connection serves the LIPA/SIPTO.

Step 13*a*: this step is optional. If this step occurs, the SGW will forward the LIPA/SIPTO connection establishment identifier in the Modify Bearer Request message. If the tunnel identifier of the PDN Connection in the LGW is disabled, it needs to be set as enabled.

Figure 4:
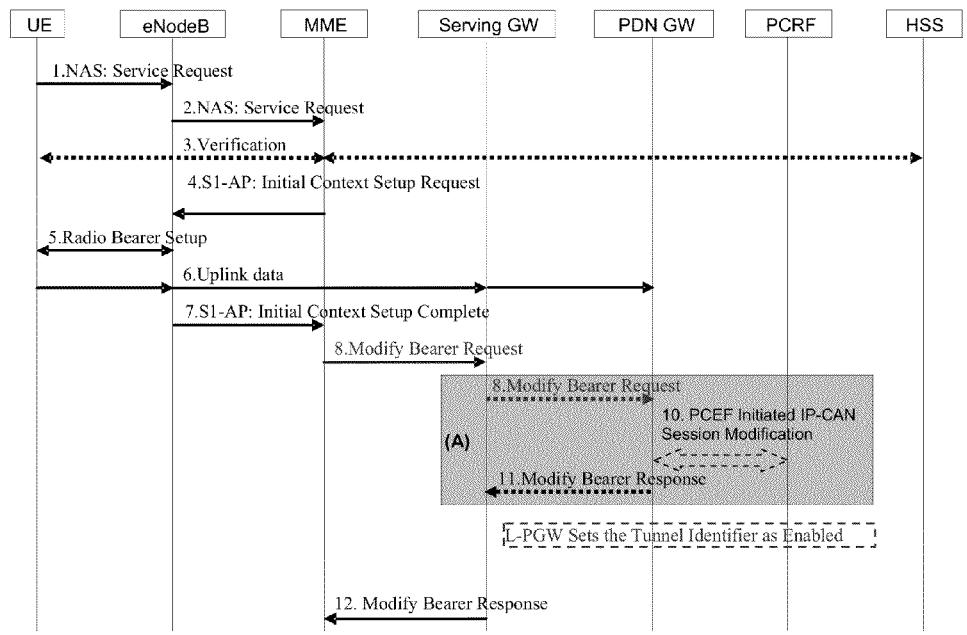
FIG. 4 is a schematic diagram of Service Request procedure when the UE is in a Connected status described in the embodiment I of the present invention.

The Service Request procedure is as shown in FIG. 4, wherein, the steps 1~7, 10, 11 and 12 which relate to the prior art will not be described herein and may be referred to the protocol TS23.401 5.3.4, while the steps relating to the present invention are described in details hereinbelow.

Step 8: after determining whether the connection is an LIPA or SIPTO connection according to the PDN Connection context, the MME will add an LIPA or SIPTO connection establishment identifier in the Modify Bearer Request message, informing the SGW that the PDN Connection serves the LIPA/SIPTO.

Step 9: if an LIPA or SIPTO connection establishment identifier is contained in the Modify Bearer Request message received by the SGW, the SGW will forward the Modify Bearer Request message containing the LIPA/SIPTO connection establishment identifier to the PGW, indicating that the UE is in a an idle status.

Step 11*a*: after receiving and then sending the Modify Bearer Request message containing the LIPA/SIPTO connection establishment identifier, the LGW will set the tunnel identifier as enabled, indicating a Direct Tunnel will be used for the connection.

Figure 5:
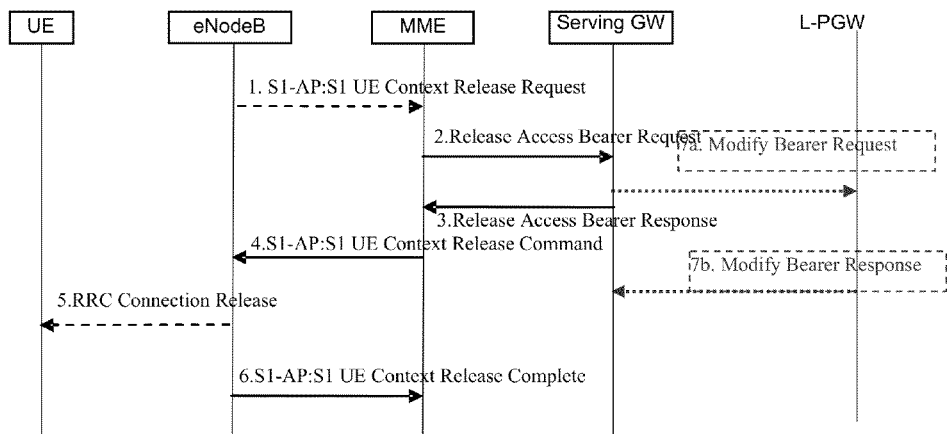
FIG. 5 is a schematic diagram of the S1 Release procedure when the UE is in an Idle status described in the embodiment I of the present invention.

If the UE is in a connected status:

The S1 Release procedure is as shown in FIG. 5, wherein, the steps 1 and 3~6 which relate to the prior art will not be described herein and may be referred to the protocol TS23.401 5.3.5, while the steps relating to the present invention are described in details hereinbelow.

Step 2: In the Release Access Bearer Request message, to distinguish the PDN Connection serving the LIPA/SIPTO from the ordinary PDN Connection, the MME needs to add an LIPA/SIPTO identifier in the default bearer ID of the PDN Connection.

Step 7a: after receiving a Bearer ID containing an LIPA/SIPTO connection removal identifier, the SGW will send the connection removal identifier to a corresponding PDN Connection via the Modify Bearer Request message, and then conduct the step 2 corresponding to the existing protocol TS23.401 5.3.5.

Step 7b: after receiving the LIPA/SIPTO connection removal identifier, the LGW will set the tunnel identifier as disabled, indicating the S5/S8-U Tunnel is used for the connection, and will send the Modify Bearer Response message to the SGW.

In the aforesaid embodiment, if the system informs the LGW with a special identifier, the special identifier needs to be contained in the Create Session Request message. Similarly, to indicate the necessity of LIPA/SIPTO connection in the Modify Bearer Request message, an identifier is also needed, therefore, an identifier may be added in the IE "Indication Flags", as shown in the following table:

| Octets | Bits | | | | | | | |
|---|---|---|---|---|---|---|---|---|
| | 8 | 7 | 6 | 5 | 4 | 3 | 2 | 1 |
| 1 | Type = 77 (decimal) | | | | | | | |
| 2 to 3 | Length = n | | | | | | | |
| 4 | Spare | | | | Instance | | | |
| 5 | DAF | DTF | HI | DFI | OI | ISRSI | ISRAI | SGWCI |
| 6 | LS | UIMSI | CFSI | CRSI | P | PT | SI | MSV |
| 7 to (n + 4) | These octet(s) is/are present only if explicitly specified | | | | | | | |

The identifier contained in the Create Session Request message indicates whether an LIPA/SIPTO connection is established. If the bit is 1, it shows that the connection is an LIPA/SIPTO connection; if the bit is 0, it shows that the LIPA/SIPTO connection is not used.

The identifier contained in the Create Session Request message is only enabled in an LIPA/SIPTO connection, in which case if the tunnel identifier is 1, it shows that the existing LIPA/SIPTO connection is being used, the UE is in a connected status, and the LGW will enable a Direct Tunnel; if the tunnel identifier is 0, it shows that the existing LIPA/SIPTO connection is not available at present, the UE is in an idle status and the LGW will enable the S5-U Tunnel.

In the Service Request procedure, the SGW forwards the identifier transparently.

In the S1 Release procedure, the LIPA/SIPTO identifier contained in the Release Access Bearer Request message received by the SGW is for determining the PDN Connections needing to send the Modify Bearer Request message with the LS identifier bit being 0.

Similarly, in the S1 Release procedure, to enable the SGW to distinguish the PDN Connection serving the LIPA/SIPTO from the ordinary PDN Connection, the LIPA/SIPTO identifier contained in the Release Access Bearer Request message is required, which may be added in the EBI to indicate the PDN Connections to which the default bearer belongs and that are using the LIPA/SIPTO, as shown in the following table:

| Octets | Bits | | | | | | | |
|---|---|---|---|---|---|---|---|---|
| | 8 | 7 | 6 | 5 | 4 | 3 | 2 | 1 |
| 1 | Type = 73 (decimal) | | | | | | | |
| 2 to 3 | Length = n | | | | | | | |
| 4 | Spare | | | | Instance | | | |
| 5 | Spare (all bits set to 0) | | | | LS | EPS Bearer ID (EBI) | | |
| 6 to (n + 4) | These octet(s) is/are present only if explicitly specified | | | | | | | |

An LS identifier bit is added. If the bit is 1, it shows the PDN Connection to which the default bearer belongs is an LIPA/SIPTO connection; if the bit is 0, it shows that the PDN Connection to which the default bearer belongs is not an LIPA/SIPTO connection.

An identifier is needed in the PDN Connection context of the LGW, indicating whether the Direction Tunnel or the S5-U Tunnel is used for the LIPA/SIPTO connection, as shown in the following table:

| For each PDN Connection within the APN: NOTE: The following entries are repeated for each PDN connection within the APN. | | |
|---|---|---|
| IP Address(es) | IPv4 address and/or IPv6 prefix | X |
| PDN type | IPv4, IPv6, or IPv4v6 | X |
| Direct Tunnel indicator | Indicate whether Direct tunnel shall be used to transport LIPA/SIPTO data. | |
| S-GW Address in Use (control plane) | The IP address of the S-GW currently used for sending control plane signalling. | X |
| S-GW TEID for S5/S8 (control plane) | S-GW Tunnel Endpoint Identifier for the S5/S8 interface for the control plane. (For GTP-based S5/S8 only). | X |
| S-GW Address in Use (user plane) | The IP address of the S-GW currently used for sending user plane traffic. (For PMIP-based S5/S8 only). | X |
| S-GW GRE Key for downlink traffic (user plane) | Serving GW assigned GRE Key for the S5/S8 interface for the user plane for downlink traffic. (For PMIP-based S5/S8 only). | X |
| P-GW IP address for S5/S8 (control plane) | P-GW IP address for the S5/S8 for the control plane signalling. | X |
| P-GW TEID for S5/S8 (control plane) | P-GW Tunnel Endpoint Identifier for the S5/S8 control plane interface. (For GTP-based S5/S8 only). | X |
| P-GW Address in Use (user plane) | The IP address of the P-GW currently used for sending user plane traffic. (For PMIP-based S5/S8 only). | X |
| P-GW GRE Key for uplink traffic (user plane) | PDN GW assigned GRE Key for the S5/S8 interface for the user plane for uplink traffic. (For PMIP-based S5/S8 only). | X |
| MS Info Change Reporting support indication | The MME and/or SGSN serving the UE support(s) procedures for reporting User Location Information and/or User CSG Information changes. | |
| MS Info Change Reporting Action | Denotes whether the MME and/or the SGSN is/are requested to send changes in User Location Information and/or User CSG Information changes for this bearer. For User CSG Information, this field denotes separately whether the MME/SGSN are requested to send changes in User CSG Information for (a) CSG cells, (b) hybrid cells in which the subscriber is a CSG member, and (c) hybrid cells in which the subscriber is not a CSG member, or any combination of the above. | |
| BCM | The negotiated Bearer Control Mode for GERAN/UTRAN. | |
| Default Bearer | Identifies the default bearer within the PDN connection by its EPS Bearer Id. The default bearer is the one which is established first within the PDN connection. (For GTP based S5/S8 or for PMIP based S5/S8 if multiple | X |

-continued

| | For each PDN Connection within the APN: NOTE: The following entries are repeated for each PDN connection within the APN. |
|---|---|
| | PDN connections to the same APN are supported). |
| EPS PDN Charging Characteristics | The charging characteristics of this PDN connection e.g. normal, prepaid, flat-rate and/or hot billing. |

If the Direct Tunnel indicator is enabled, it shows that the LGW uses a Direct Tunnel for LIPA/SIPTO data transmission; if the indicator is disabled, it shows the LGW enables the S5-U Tunnel.

Embodiment II

In the embodiment II, a SGW mainly adopts the LIPA/SIPTO identifier included in the context of PDN connection to indicate whether PDN connection is using LIPA/SIPTO when establishing a PDN connection, thus enabling the SGW to inform the PGW of how to select a data plane tunnel. This embodiment is applied in occasions where the status of the UE is changed frequently, which may reduce the to quantity of information in the signaling message.

Figure 6:
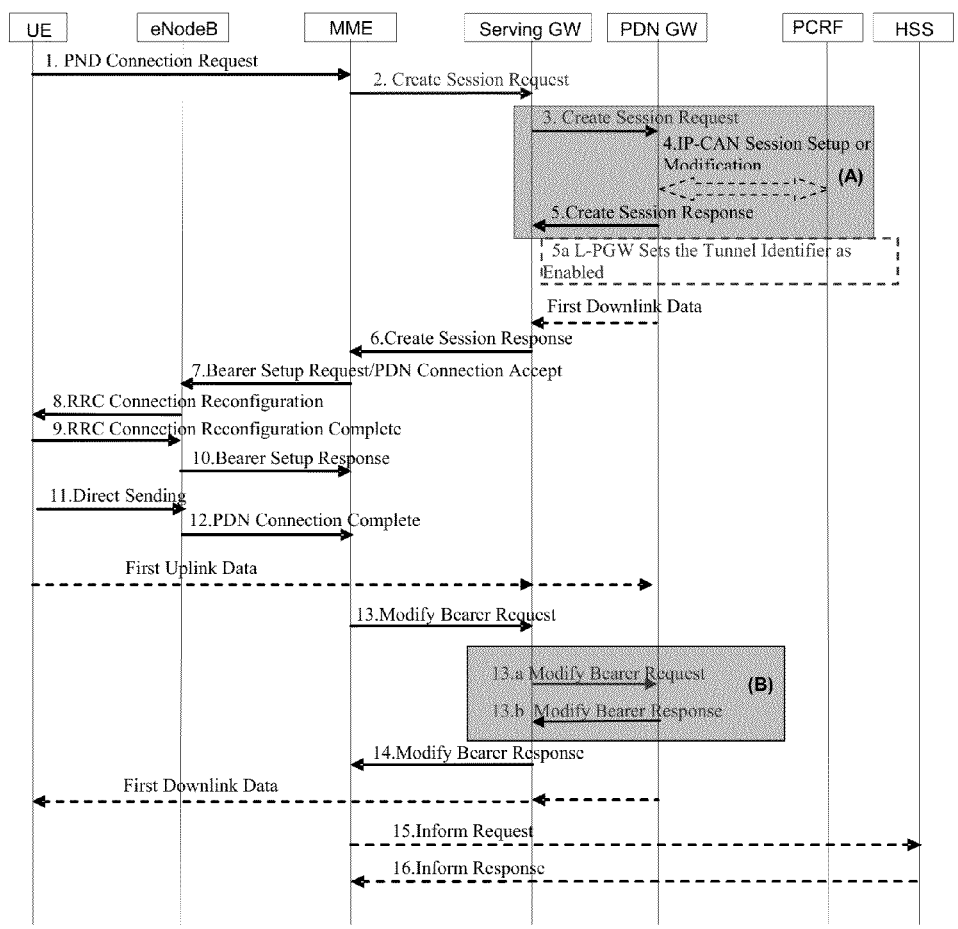
FIG. 6 is a schematic diagram of the UE Requested PDN Connectivity or Attach procedure when the UE is in an Connected status described in the embodiment II of the present invention.

If the UE is in a connected status:

The UE Requested PDN Connectivity or Attach procedure is as shown in FIG. 6, wherein, the steps 1, 4, 5, 6~16 relate to the prior art, which will not be described herein and may be referred to the protocol TS23.401 5.10.2, and the steps relating to the present invention are described in details hereinbelow.

Step 2: an identifier of MME is included in the Create Session Request, which indicates that the PDN Connection is used for LIPA/SIPTO. After SGW receives the identifier, an LIPA/SIPTO identifier is added in the PDN Connection Context to indicate that the PDN Connection is used for LIPA/SIPTO.

Step 3: Serving GW sends the Create Session Request to a PGW. If the PDN Connection is used for LIPA/SIPTO, the PGW is an LGW. If the system informs the LGW with a special APN, the LGW needs to determine whether the connection is used for LIPA/SIPTO, or an identifier for LIPA/SIPTO connection establishment is included in the Create Session Request.

Step 5a: When the LGW receives the identifier for LIPA/SIPTO connection to establishment, the LGW sets the tunnel identifier of the UE as enabled, indicating that the LGW uses a Direct Tunnel.

Step 13a: this step is optional. If this step occurs, the SGW checks the PDN Connection context of the received Modify Bearer Request (the PDN Connection has an LIPA/SIPTO identifier at this moment), and sends the Modify Bearer Request with an identifier for LIPA/SIPTO connection establishment to the PGW. If the tunnel identifier of PDN Connection in the LGW is disabled, it is necessary to set it as enabled.

Figure 7:
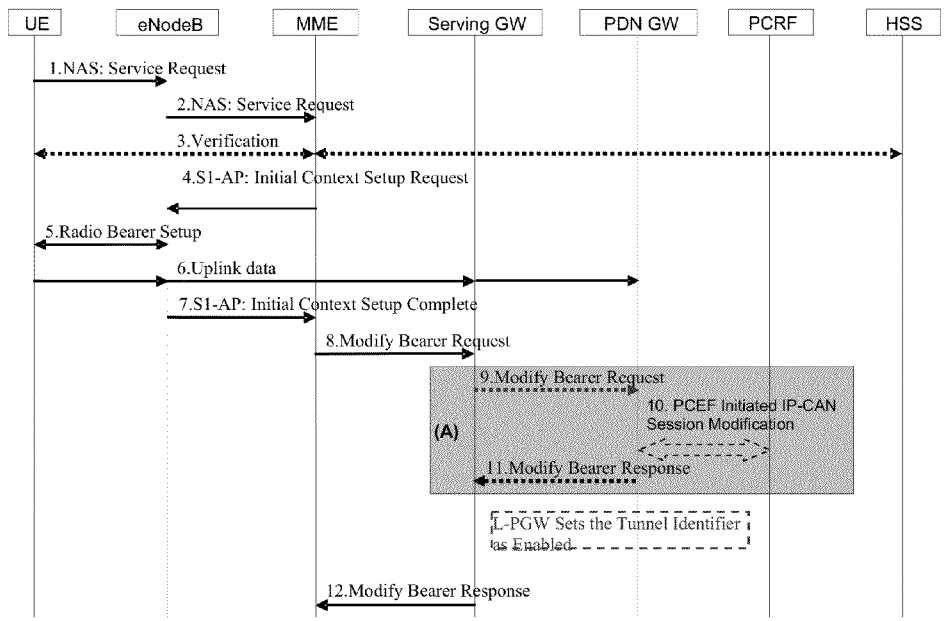
FIG. 7 is a schematic diagram of the Service Request procedure when the UE is in a Connected status described in the embodiment II of the present invention.

The Service Request procedure is as shown in FIG. 7, wherein, the steps 1~8, 10, 11, 12 relate to the prior art, which will not be described herein and may be referred to the protocol TS23.401 5.3.4, and the steps relating to the present invention are described in details hereinbelow.

Step 9: if the PDN Connection of Modify Bearer Request received by SGW has an LIPA/SIPTO identifier, the SGW sends a Modify Bearer Request with an identifier for LIPA/SIPTO connection establishment to the PGW, indicating that the UE is in a Connected status.

Step 11a: upon receiving the identifier for LIPA/SIPTO connection establishment included in the Modify Bearer Request and sending a Modify Bearer Response, the LGW sets the tunnel identifier enabled, indicating that Direct Tunnel is used for this connection.

Figure 8:
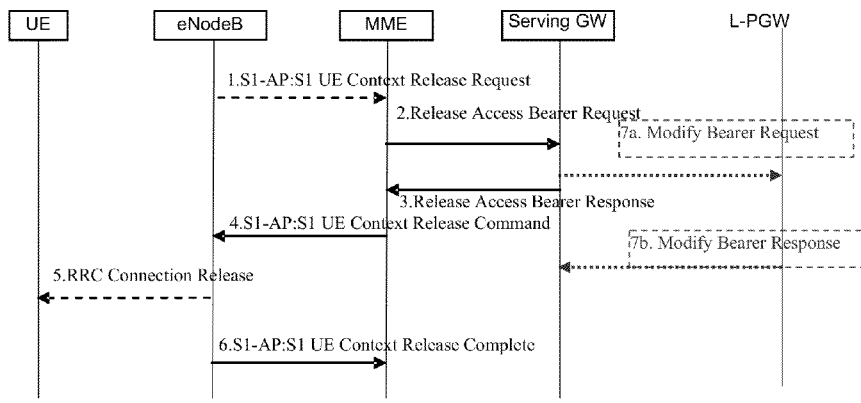
FIG. 8 is a schematic diagram of the S1 Release procedure when the UE is in an Idle status described in the embodiment II of the present invention.

When the UE is in an idle status:

S1 Release procedure is shown in FIG. 8, wherein, steps 1~16 relate to the prior art, which will not be described herein and may be referred to the protocol TS23.401 5.3.5, and the steps relating to the present invention are described in details hereinbelow.

Step 7a: upon receiving the default bearer ID list in the Release Access Bearer Request message, the SGW finds out whether an LIPA/SIPTO identifier is included in the PDN Connection corresponding to each Default Bearer ID, if yes, sends a Modify Bearer Request to the corresponding LGW with an identifier for LIPA/SIPTO connection teardown, and then processes in accordance with step 2 in existing protocol TS23.401 5.3.5.

Step 7b: upon receiving the identifier for LIPA/SIPTO connection teardown, the LGW sets the tunnel identifier disabled, indicating that S5/S8-U Tunnel will be used for this connection, and sends a Modify Bearer Response to the SGW at the same time.

In the embodiment II, if the system informs the LGW with a special identifier, the special identifier needs to be included in the Create Session Request. Similarly, to indicate whether LIPA/SIPTO connection should exist in the Modify Bearer Request, an identifier also needs to be included, thus an indication can be added in IE "Indication Flags" as shown in the table hereinbelow:

| | Bits | | | | | | | |
|---|---|---|---|---|---|---|---|---|
| Octets | 8 | 7 | 6 | 5 | 4 | 3 | 2 | 1 |
| 1 | Type = 77 (decimal) | | | | | | | |
| 2 to 3 | Length = n | | | | | | | |
| 4 | Spare | | | | | Instance | | |
| 5 | DAF | DTF | HI | DFI | OI | ISRSI | ISRAI | SGWCI |
| 6 | LS | UIMSI | CFSI | CRSI | P | PT | SI | MSV |
| 7 to (n + 4) | These octet(s) is/are present only if explicitly specified | | | | | | | |

The identifier is included in the Create Session Request to indicate whether to establish LIPA/SIPTO connection, and 1 bit indicates that it is LIAP/SIPTO connection while 0 bit indicates that it is not LIAP/SIPTO connection.

The identifier included in the Modify Bearer Request is effective only in LIPA/SIPTO connection. If the tunnel identifier is 1, the existing LIPA/SIPTO connection is in use and the UE is in a connected status; if the tunnel identifier is 0, the existing LIPA/SIPTO connection is not in use for the time being and the UE is in an idle status.

In the Service Request procedure, the SGW checks whether the LIPA/SIPTO identifier is included in the PDN Connection of Modify Bearer, if yes, the SGW sets the LS identifier bit as 1 in the Modify Bearer Request sent to the LGW.

In the S1 Release procedure, the SGW finds out whether the LIPA/SIPTO identifier is included in the PDN Connection corresponding to each default bearer ID in the Release Access Bearer, if yes, sends a Modify Bearer Request to the corresponding LGW and sets the LS identifier bit as 0 in the message.

Identifiers are necessary to be added in the context of PDN Connection of the LGW to indicate which tunnel to be used for LIPA/SIPTO connection, direct tunnel or S5-U tunnel. The added identifiers are as shown in the table hereinbelow:

| For each PDN Connection within the APN: NOTE: The following entries are repeated for each PDN connection within the APN. | | |
|---|---|---|
| IP Address(es) | IPv4 address and/or IPv6 prefix | X |
| PDN type | IPv4, IPv6, or IPv4v6 | X |
| Direct Tunnel indicator | Indicate whether Direct tunnel shall be used to transport LIPA/SIPTO data. | |
| S-GW Address in Use (control plane) | The IP address of the S-GW currently used for sending control plane signalling. | X |
| S-GW TEID for S5/S8 (control plane) | S-GW Tunnel Endpoint Identifier for the S5/S8 interface for the control plane. (For GTP-based S5/S8 only). | X |
| S-GW Address in Use (user plane) | The IP address of the S-GW currently used for sending user plane traffic. (For PMIP-based S5/S8 only). | X |
| S-GW GRE Key for downlink traffic (user plane) | Serving GW assigned GRE Key for the S5/S8 interface for the user plane for downlink traffic. (For PMIP-based S5/S8 only). | X |
| P-GW IP address for S5/S8 (control plane) | P-GW IP address for the S5/S8 for the control plane signalling. | X |
| P-GW TEID for S5/S8 (control plane) | P-GW Tunnel Endpoint Identifier for the S5/S8 control plane interface. (For GTP-based S5/S8 only). | X |
| P-GW Address in Use (user plane) | The IP address of the P-GW currently used for sending user plane traffic. (For PMIP-based S5/S8 only). | X |
| P-GW GRE Key for uplink traffic (user plane) | PDN GW assigned GRE Key for the S5/S8 interface for the user plane for uplink traffic. (For PMIP-based S5/S8 only). | X |
| MS Info Change Reporting support indication | The MME and/or SGSN serving the UE support(s) procedures for reporting User Location Information and/or User CSG Information changes. | |
| MS Info Change Reporting Action | Denotes whether the MME and/or the SGSN is/are requested to send changes in User Location Information and/or User CSG Information changes for this bearer. For User CSG Information, this field denotes separately whether the MME/SGSN are requested to send changes in User CSG Information for (a) CSG cells, (b) hybrid cells in which the subscriber is a CSG member, and (c) hybrid cells in which the subscriber is not a CSG member, or any combination of the above. | |
| BCM | The negotiated Bearer Control Mode for GERAN/UTRAN. | |
| Default Bearer | Identifies the default bearer within the PDN connection by its EPS Bearer Id. The default bearer is the one which is established first within the PDN connection. (For GTP based S5/S8 or for PMIP based S5/S8 if multiple PDN connections to the same APN are supported). | X |
| EPS PDN Charging Characteristics | The charging characteristics of this PDN connection e.g. normal, prepaid, flat-rate and/or hot billing. | |

When the Direct Tunnel indicator is enabled, it indicates that the LGW transports LIPA/SIPTO data with Direct Tunnel; when the indicator is disabled, it indicates the LGW transports the data with S5-U Tunnel.

Figure 9:
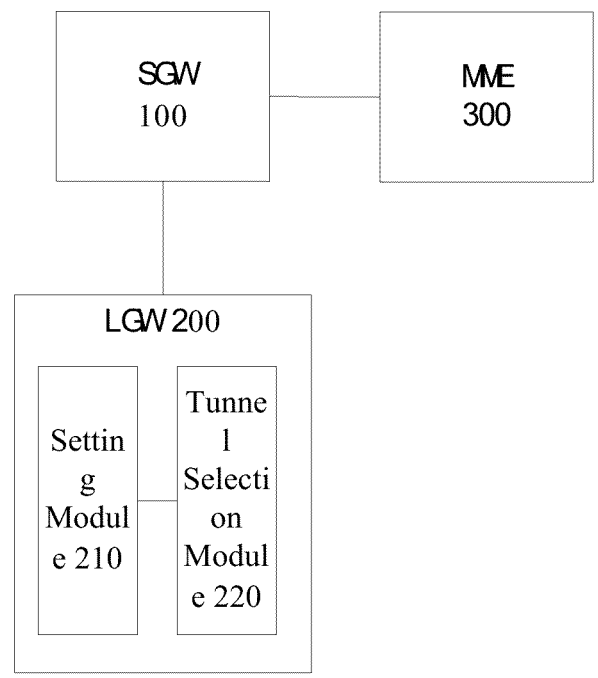
FIG. 9 is a systematic structure diagram of the selection of data plane tunnel according to the UE status described in an embodiment of the present invention.

FIG. 9 is a systematic structure diagram of the selection of data plane tunnel according to the UE status described in an embodiment of the present invention. This system comprises a SGW 100 for determining the status of the UE and whether a connection is used for LIPA/SIPTO and instructing the LGW 200, and the LGW 200 for setting a tunnel identifier status of the LGW 200 according to the instruction of the SGW 100, and selecting the data plane tunnel according to the tunnel identifier status Wherein, when the UE is in an idle status, the tunnel identifier is disabled and the LGW 200 selects S5/S8-U Tunnel; when the UE is in a connected status, the tunnel identifier is enabled and the LGW 200 selects the Direct Tunnel.

In a preferred embodiment of the present invention, this system also includes the MME 300 used for informing the SGW 100 through an indicator included in the Create Session Request when determining that the connection to be established is used for LIPA/SIPTO, which will then inform the LGW 200. The LGW 200 sets the tunnel identifier as enabled.

In another preferred embodiment of the present invention, the system also includes the MME 300 used for adding an identifier for LIPA/SIPTO connection establishment to the Modify Bearer Request when determining that the connection is LIPA/SIPTO connection according to the context of the PDN Connection, to inform the SGW 100 of that the PDN Connection is used for LIPA/SIPTO service, which will then inform the LGW 200 of the same, and then the LGW 200 sets the tunnel identifier as enabled. In a preferred embodiment of the present invention, the LGW 200 comprises a setting module 210 used for setting a tunnel identifier status according to the instruction of the SGW, and a tunnel selection module 220 for selecting a data plane tunnel according to the tunnel identifier status.

Wherein, when the UE is in an idle status, the tunnel identifier is disabled and the tunnel selection module 220 selects S5/S8-U Tunnel; when a UE is in a connected status, the tunnel identifier is enabled and the tunnel selection module 220 selects the Direct Tunnel.

The present invention selects an appropriate data plane tunnel by setting a tunnel identifier in the LGW, and proposes a method for controlling the setting/clearing of the tunnel identifier, therefore the present invention enjoys comprehensive functions and may make up the disadvantage of LIPA/SIPTO architecture in the prior art.

Though the embodiments of the present invention have been presented and described, those skilled in the art may make various changes, modifications, replacement and transformations without departing from the substance or scope of the present invention, which is defined by the appended claims and equivalents.

With the description of the preferred embodiments hereinabove, those skilled in the art can clearly understand that the present invention can be realized with the aid of software and necessary commonly used hardware platforms, or the aid of hardware of course, but the former is a preferred embodiment in most cases. Based on this understanding, the technical proposal of the present invention or the part contributing to the prior art can be reflected in the form of a software product, which is saved in a memory medium comprising instructions to enable a computer, which could be a personal computer, a server or a network device, to carry out the methods for each embodiment of the present invention.

Those skilled in the art can understand that the drawings are only schematic drawings of a preferred embodiment, and the module or procedure in the drawings is not necessarily a must for the embodiments of the present invention.

Those skilled in the art can understand that the modules in the device of the embodiments can be distributed in the device of the embodiments according to the description of the embodiments, and can be placed in a or more device(s) different from the embodiment after corresponding changes as well. The aforesaid modules of the embodiment can be incorporated into a module or further split into multiple modules.

The invention claimed is:

1. A method for selecting a data plane tunnel according to a status of a User Equipment (UE), comprising:
   a Local Gateway (LGW) determines the status of the UE according to an instruction of a Serving Gateway (SGW);
   the LGW selects a data plane tunnel according to the status of the UE;
   wherein the instruction of the SGW is a message carrying one of a Local IP Access (LIPA)/Selected IP Traffic Offload (SIPTO) connection establishment identifier, an identifier for LIPA/SIPTO connection teardown and an identifier of whether establishing a LIPA/SIPTO connection, sent from the SGW to the LGW;
   wherein the LIPA/SIPTO connection establishment identifier indicates that the UE is in a Connected statue; the identifier for LIPA/SIPTO connection teardown indicates that the UE is in an idle status; when the identifier of whether establishing a LIPA/SIPTO connection is an identifier of establishing the LIPA/SIPTO connection, it indicates that the UE is in the Connected statue; and when the identifier of whether establishing a LIPA/SIPTO connection is an identifier of not establishing the LIPA/SIPTO connection, it indicates that the UE is in the idle status.

2. The method according to the claim 1, wherein the message carrying one of the LIPA/SIPTO connection establishment identifier, the identifier for LIPA/SIPTO connection teardown and the identifier of whether establishing a LIPA/SIPTO connection, sent from the SGW to the LGW, is a Modify Bearer Request message carrying the LIPA/SIPTO connection establishment identifier, or, a Modify Bearer Request message carrying the identifier for LIPA/SIPTO connection teardown, or, a Release Access Bearer Request message carrying the LIPA/SIPTO connection establishment identifier, or, a Create Session Request message carrying an identifier of whether establishing a LIPA/SIPTO connection.

3. The method according to the claim 2, further comprising:
   the LGW sets a tunnel identifier status of the LGW according to the instruction of the SGW; and selects the data plane tunnel according to the tunnel identifier status.

4. The method according to claim 3, wherein the tunnel identifier status includes: when the UE is in the idle status, the tunnel identifier status is set as disabled; when the UE is in the Connected status, the tunnel identifier status is set as enabled;
   wherein,
   if the tunnel identifier status is set as disabled, the LGW selects the S5/S8-U Tunnel;
   if the tunnel identifier status is set as enabled, the LGW selects a Direct Tunnel.

5. The method according to claim 4, further comprising:
   if a mobility management entity (MME) determines that a connection to be established is used for LIPA/SIPTO, the MIME informs the SGW by containing an identifier in a Create Session Request message, and the SGW informs the LGW with the Create Session Request message carrying an identifier of establishing a LIPA/SIPTO connection so that the LGW which will sets a tunnel identifier status as enabled.

6. The method according to claim 4, further comprising:
   after determining that a connection to be established is the LIPA or SIPTO connection according to a PDN (Packet Data Network) Connection context, the MIME adds the LIPA or SIPTO connection establishment identifier in the Modify Bearer Request message, and inform the SGW that a PDN Connection serves the LIPA/SIPTO, the SGW informs the LGW with the Modify Bearer Request message carrying the LIPA/SIPTO connection establishment identifier so that the LGW which will sets the tunnel identifier status as enabled.

7. The method according to claim 4, further comprising:
   if a PDN Connection serves the LIPA/SIPTO in an S1 Release procedure, a mobility management entity (MME) adds a LIPA/SIPTO connection establishment identifier in a Release Access Bearer Request message, and instruct the SGW with a Release Access Bearer Request message carrying the LIPA/SIPTO connection establishment identifier, the SGW instructs the LGW with the Modify Bearer Request message carrying the LIPA/SIPTO connection establishment identifier so that the LGW so that the LGW sets the tunnel identifier status as disabled.

8. The method according to claim 7, wherein, after setting the tunnel identifier status as disabled, the LGW sends a Modify Bearer Response message to the SGW.

9. The method according to claim 7, further comprising:
   after receiving a Default Bearer ID list contained in the Release Access Bearer Request message, the SGW determines whether PDN Connections corresponding to the Default Bearer ID contain the LIPA/SIPTO connection establishment identifier, if yes, the SGW sends the Modify Bearer Request message carrying the LIPA/SIPTO connection establishment identifier to the corresponding LGW; the LGW sets the tunnel identifier status as disabled according to the LIPA/SIPTO connection establishment identifier.

10. The method according to claim 4, further comprising:
    if determining that a connection to be established is used for LIPA or SIPTO, a mobility management entity (MME) instructs that a PDN Connection is used for LIPA/SIPTO by containing an identifier in the Create Session Request message; the SGW adds an LIPA/SIPTO connection establishment identifier in the PDN Connection Context, indicating the PDN Connection is used for LIPA/SIPTO, and informs the LGW with the Create Session Request message carrying an identifier of establishing the LIPA/SIPTO so that the LGW sets the tunnel identifier status as enabled.

11. The method according to claim 10, further comprising:
    if the PDN Connection to which a Modify Bearer Request message received by the SGW belongs contains the LIPA/SIPTO connection establishment identifier, the SGW sends the Modify Bearer Request message containing the LIPA/SIPTO connection establishment identifier to a PGW (PDN Gateway), indicating that the UE is in the Connected status, and the LGW sets the tunnel identifier status as enabled.

12. A system for selecting a data plane tunnel according to a status of a User Equipment (UE), comprising a Serving Gateway (SGW) and a Local Gateway (LGW), wherein, the SGW is used for determining the status of the UE and whether a connection is used for Local IP Access (LIPA)/Selected IP Traffic Offload (SIPTO), and instructs the LGW; the LGW is used for determining the status of the UE according to an instruction of the SGW, and selecting a data plane tunnel according to the status of the UE;
    wherein the instruction of the SGW is a message carrying one of a LIPA/SIPTO connection establishment identifier, an identifier for LIPA/SIPTO connection teardown and an identifier of whether establishing a LIPA/SIPTO connection, sent from the SGW to the LGW;
    wherein the LIPA/SIPTO connection establishment identifier indicates that the UE is in a Connected statue; the identifier for LIPA/SIPTO connection teardown indicates that the UE is in an idle status; when the identifier of whether establishing a LIPA/SIPTO connection is an identifier of establishing the LIPA/SIPTO connection, it indicates that the UE is in the Connected statue; and when the identifier of whether establishing a LIPA/SIPTO connection is an identifier of not establishing the LIPA/SIPTO connection, it indicates that the UE is in the idle status.

13. The system according to claim 12, wherein, the LGW comprises a setting module and a tunnel selection module, wherein,
the setting module is used for setting a tunnel identifier status according to the instruction of the SGW, and the tunnel selection module is for selecting a data plane tunnel according to the tunnel identifier status.

14. The system according to claim 13, wherein, the tunnel identifier status includes: when the UE is in the idle status, the tunnel identifier status is set as disabled; when the UE is in the connected status, the tunnel identifier status is set as enabled;
the tunnel selection module is used for selecting the S5/S8-U Tunnel when the tunnel identifier status is set as disabled; and selecting a Direct Tunnel when the tunnel identifier status is set as enabled.

15. The system according to the claim 12, wherein the message carrying one of the LIPA/SIPTO connection establishment identifier, the identifier for LIPA/SIPTO connection teardown and the identifier of whether establishing a LIPA/SIPTO connection, sent from the SGW to the LGW, is a Modify Bearer Request message carrying the LIPA/SIPTO connection establishment identifier, or, a Modify Bearer Request message carrying the identifier for LIPA/SIPTO connection teardown, or, a Release Access Bearer Request message carrying the LIPA/SIPTO connection establishment identifier, or, a Create Session Request message carrying an identifier of whether establishing a LIPA/SIPTO connection.

16. The system according to the claim 15, wherein, the LGW is used for setting a tunnel identifier status of the LGW according to the instruction of the SGW; and selecting a data plane tunnel according to the tunnel identifier status.

17. The system according to claim 16, wherein, the tunnel identifier status includes: when the UE is in the idle status, the tunnel identifier status is set as disabled; when the UE is in the connected status, the tunnel identifier status is set as enabled; if the tunnel identifier status is set as disabled, the LGW selects the S5/S8-U tunnel; and if the tunnel identifier status is set as enabled, the LGW selects a direct tunnel.

18. The system according to claim 17, further comprising:
a mobility management entity (MME), which is used for informing the SGW by carrying an identifier in a Create Session Request message when determining that the connection to be established is used for LIPA or SIPTO;
wherein the SGW is used for instructing the LGW with the Create Session Request message carrying an identifier of establishing a LIPA/SIPTO connection that the connection to be established is used for LIPA or SIPTO; and
the LGW is used for setting the tunnel identifier status as enabled.

19. The system according to claim 17, further comprising:
a mobility management entity (MME), which is used for adding the LIPA/SIPTO connection establishment identifier in a Modify Bearer Request message when determining that a connection to be established is used for LIPA or SIPTO according to a PDN Connection context, and instructing the SGW that a PDN Connection is used for LIPA or SIPTO;
wherein the SGW is used for instructing the LGW with the Modify Bearer Request message carrying the LIPA/SIPTO connection establishment identifier that the PDN Connection is used for LIPA or SIPTO; and
the LGW used for setting the tunnel identifier status as enabled.

20. A method for selecting a data plane tunnel according to a status of a user equipment (UE), a tunnel identifier is arranged for the UE in a Local Gateway (LGW), comprising:
when the UE is in an idle status, the tunnel identifier is set as disabled, in which case, the LGW selects the S5/S8-U Tunnel; and
when the UE is in a connected status, the LGW selects a Direct Tunnel.

21. The method according to the claim 20, further comprising:
when the UE is in the connected status, the tunnel identifier is set as enabled, in which case the LGW selects a Direct Tunnel.

* * * * *